March 9, 1954  G. B. HOUCK, JR  2,671,851

MONOCYCLIC SQUARE DISCRIMINATOR

Filed Feb. 7, 1952

INVENTOR.
GLADDEN B. HOUCK, JR.

BY *H. L. Mackey*

ATTORNEY.

Patented Mar. 9, 1954

2,671,851

UNITED STATES PATENT OFFICE 2,671,851

MONOCYCLIC SQUARE DISCRIMINATOR

Gladden B. Houck, Jr., Port Chester, N. Y., assignor to General Precision Laboratory Incorporated, a corporation of New York Application February 7, 1952, Serial No. 270,388

7 Claims. (Cl. 250—30)

This invention pertains to electrical discriminators and more specifically to frequency discriminators having a direct-current output magnitude proportional to input frequency deviation and employed for converting a frequency-modulated input to a demodulated output.

The discriminator of this invention is suitable for use at any frequencies used with wire circuits and is particularly useful at the usual intermediate frequencies of frequency modulated radio receivers and of television audio channel receivers. The discriminator converts a frequency-modulated input to a push-pull phase and amplitude-modulated potential by taking advantage of the properties of the monocyclic square, then demodulates this converted potential by use of a ratio detector or other conventional detector.

The monocyclic square is a special form of the lattice or bridge network comprising two opposite capacitances and two opposite inductances, all four having equal reactance at a selected frequency, and thus forms two series resonant circuits in parallel. It is combined in this invention with an input series impedance and an output shunt impedance, both preferably but not necessarily non-reactive. When the monocyclic square is energized by alternating current of resonant frequency at opposite and nonadjacent diagonal points, the output voltage at the other diagonal points differs in magnitude and phase from the input current by exactly 90°, and at frequencies other than resonance differs in phase by greater or lesser amounts depending on the sense of departure from resonance.

It is this property of the monocyclic square that is employed in the instant invention.

An object of the invention, therefore, is to provide an improved means for converting the frequency variations of a signal to corresponding amplitude variations, the improved means being economical without at the same time entailing any sacrifice in performance capabilities.

Further understanding of this invention may be secured from the detailed description and the drawings, in which.

Figure 1:
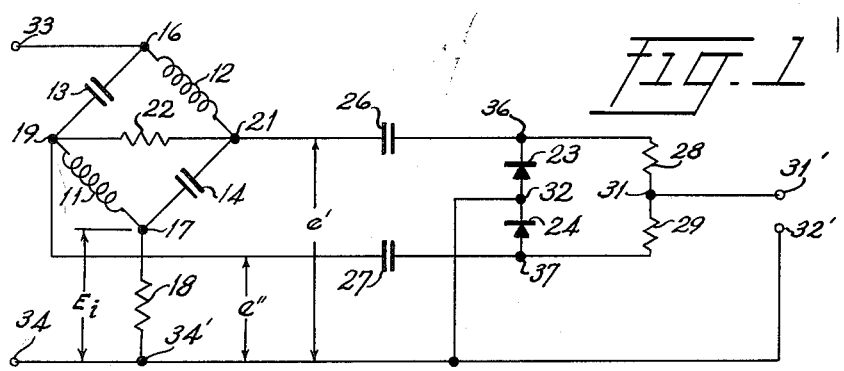
Figure 1 depicts the circuit of the invention.

Referring now to Fig. 1, a monocyclic square is composed of two equal inductances 11 and 12 and two equal capacitances 13 and 14, all connected in series with inductance and capacitance alternating around the square. The reactance of each inductance is made to be equal to the reactance of each capacitance at a selected frequency $f_0$. The inductances 11 and 12 may be so physically associated as to have mutual inductance without changing the functioning of the circuit because the voltages across them are always in phase, as will appear later. Likewise, this mutual inductance may be of any desired amount. This possibility of using mutual inductance is very important in the practical design, because under such circumstances the two inductance coils may be closely coupled and indeed may consist of unity coupled bifilar windings on a single core form tuned by the adjustment of a single magnetic core slug, thus in effect reducing the number of components by one. The employment of mutual inductance also materially reduces the sizes of coils required.

Either pair of diagonally opposed junctions of the square may be used as the input voltage terminals, for example, the diagonally opposed junctions 16 and 17. Since at resonance with high impedance load the impedance of the monocyclic square between these terminals 16 and 17 is nearly zero, an external series impedance 18 is introduced to control the input impedance under all conditions and to serve as a phase reference. The input frequency may have any value, but because of the usefulness of this circuit in frequency modulation receivers and television receivers, an input frequency of 11 mc. p. s. is selected for illustration.

As an example of the magnitudes of components for use at this frequency of 11 mc. p. s., the capacitances 13 and 14 each consist of a 50 $\mu\mu f$ condenser, and the inductances 11 and 12 are bifilarly wound with a single tuning slug. The inductance unit is then so adjusted that the self plus mutual inductance of each winding forms with its associated condenser a series circuit resonant at 11 mc. p. s. Such self and mutual inductance is represented in Fig. 1 by the inductor 12, which forms its resonant series circuit with condenser 14. Similarly the inductor 11 represents both self inductance and mutual inductance and forms with the condenser 13 a resonant series circuit.

The output is taken from the remaining diagonal junctions or terminals 19 and 21. In order to control the bandwidth, particularly when the load circuit has high impedance as is the usual condition, a relatively low impedance 22 is connected between terminals 19 and 21. This low impedance 22 may, for example, consist of a 1600-ohm resistance.

The load circuit connected to the terminals 19 and 21 may consist of any suitable detector. In the preferred circuit of Fig. 1 two rectifiers 23 and 24 are connected in series aiding across the terminals 19 and 21 through two large coupling condensers 26 and 27, the rectifiers being preferably electronic tubes or crystal diodes. Two equal resistors 28 and 29 are connected in series across the rectifiers 23 and 24 and the output is taken from their junction 31 and the common rectifier junction 32. The junction 32 is also connected to the input terminal 34' of the input impedor 18.

Figure 5:
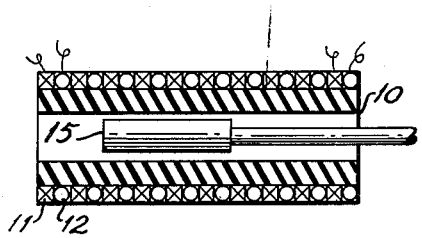
Figure 5 is a diagrammatic illustration of an arrangement utilizing bifilar coil windings tuned by a single magnetic core slug.

In Fig. 5 an arrangement for tuning both coils 11 and 12 by the adjustment of a single magnetic core is illustrated. In this arrangement coils 11 and 12 are bifilarly wound as indicated by the alternate symbols $x$ and $o$, on a single core form 10 provided with an adjustably positioned magnetic core 15 composed of powdered iron particles or other suitable material. Also a saturable reactor can be used for electronic tuning.

Figure 2:
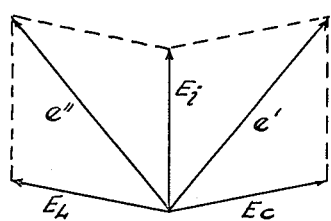
Figures 2, 3 and 4 are vector diagrams illustrating the operation of the circuit of Fig. 1.

In operation, alternating potential having a center frequency of 11 mc. p. s. and an audio frequency modulation, similar to the output of the intermediate frequency amplifier of a frequency modulation receiver or preferably similar to the output of the limiter thereof, is applied to terminals 33 and 34. The voltage developed across impedance 18 which for simplicity of understanding is here considered as pure resistance, is indicated by the vector $E_1$ in Fig. 2 At center frequency the voltage across condenser 14 lags $E_1$ and is represented in Fig. 2 by $E_c$. Since the circuit components are not ideal and because the output resistance is not infinite, $E_c$ is not exactly in quadrature to $E_1$. Similarly the voltage across the inductance 11 is represented by the leading vector $E_L$. The voltage between junctions 21 and 34' is the vector sum of the component voltages of the resistor 18 and capacitor 14 and is represented in Fig. 2 by the diagonal of the parallelogram constructed on the vectors $E_1$ and $E_c$, or $e'$. Similarly, the voltage between the junctions 19 and 34' is represented by $e''$. The alternating voltage $e'$ applied to the diode 23 causes a proportional positive voltage to accumulate at its terminal 36 relative to its common terminal 32, and similarly a negative voltage proportional to $e''$ accumulates at 37. The sum of these two voltages is applied across the series resistors 28 and 29 and since these resistors are equal, the median voltage is applied to the output terminal 31'. However, since $e'=e''$ this median voltage equals that of 34' and 32', therefore zero output potential exists across the output terminals 31' and 32'. That is, when instantaneously the input voltage frequency equals the designed center frequency of the circuit, the output voltage is zero.

Figure 3:
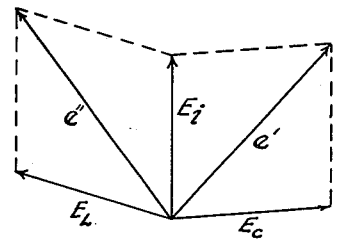

If, however, the input frequency is slightly different from the designed center frequency, for example is 1000 cycles less, the vector $E_c$ has a greater phase lag and the vector $E_L$ has a smaller lead angle. This is illustrated in Fig. 3. The scalar magnitudes of the resultant voltages $e'$ and $e''$ are then no longer equal, but $e''$ is greater than $e'$. The positive voltage that accumulates at 36 is then less than the negative voltage that accumulates at 37 and the potential of the output terminal 31' becomes negative relative to the terminal 32'. In a similar manner, when the input frequency is higher than the design frequency, $e'$ becomes larger than $e''$ and terminal 31' becomes positive relative to 32', the output potential being proportional to the algebraic difference of the scalar values of the vectors $e'$ and $e''$, and approximately proportional to the frequency deviation of the input signal from its center frequency.

It is thus obvious that any device which detects disparity between the real values of the vectors $e'$ and $e''$ may be employed in this invention, as for example any amplitude demodulator employing a discharge tube, a crystal detector, or a transistor, or any other non-linear component. The output may either be single-ended as illustrated or may be of the push-pull type. In either case the output terminals are connected to any conventional device for audibly, visually or otherwise utilizing the demodulated output signal.

Figure 4:
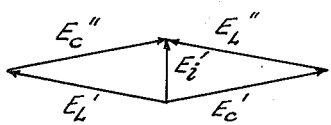

The vector relations within the monocyclic square are shown in Fig. 4. $E_1'$ is the voltage across the effective ohmic resistance of the four elements of the monocyclic square, between terminals 17 and 16. This voltage is shown exaggerated as it is small and was for that reason neglected in Figs. 2 and 3. $E_c'$ and $E_L'$ are the voltages across the capacitance 14 and inductance 11, respectively, and are equal in phase angle and magnitude as shown when the input frequency equals the resonant frequency. $E_L''$ and $E_c''$ are the voltages across the inductance 12 and capacitance 13 respectively, $E_L''$ being represented as a vector parallel to $E_L'$ and the vector $E_c''$ being parallel to $E_c'$. This being so, the phases of the two inductances are the same, thus permitting the employment of mutual inductance between the two inductors. Similarly, mutual capacitance is permitted between the capacitors.

Summarizing the operation of this device, the monocyclic square converts frequency deviations of the input signal to phase deviations and these in turn are converted to amplitude deviations and at the same time are demodulated by the detector, the output appearing as direct current varying in accordance with the frequency-modulated envelope of the input signal.

It is obvious that more than one monocyclic square may be connected in tandem to secure a discriminator having special properties.

What is claimed is:

1. A frequency discriminator comprising, a pair of equal inductors and a pair of equal capacitors, the reactance of each capacitor being equal to the reactance of each inductor at a selected frequency, circuit means for connecting said pair of inductors and pair of capacitors in a single mesh lattice network the inductors alternating in position with the capacitors, a series impedor, means for applying a frequency-modulated alternating current voltage having a center frequency equal to said selected frequency to two diagonally opposite junctions of said lattice network in series with said series impedor, a shunt impedor connected to the remaining two diagonally opposite junctions of said lattice network, and detection means connected to said remaining two diagonally opposite junctions of said lattice network.

2. A frequency discriminator comprising, a first and second inductor, a first and second capacitor, the reactance of said inductors and capacitors all being equal at a selected frequency, a first junction connecting said first inductor and said first capacitor, a second junction connecting said second inductor and said second capacitor, a third junction connecting the remaining terminals of said first inductor and said second capacitor, a fourth junction connecting the remaining terminals of said first capacitor and said second inductor, a series impedor having one terminal connected to said first junction, means for applying electrical frequency-modulated energy having a central frequency equal to said selected frequency between the remaining terminal of said series impedor and said second junction, a shunt impedor connected between said third and fourth junctions, and means connected between said third and fourth junctions for detecting and demodulating voltage amplitude changes therebetween that are in accordance with the modulation envelope of the electrical energy applied to said discriminator.

3. A frequency discriminator comprising, a four arm bridge circuit having each of one pair of opposite arms composed of an inductance coil and each of the other pair of opposite arms composed of a capacitor, means for applying a frequency modulated potential to one pair of conjugate terminals, means for rectifying the potential existing at the other pair of conjugate terminals, the inductance coils included in the one pair of opposite arms being bifilarly wound, and a common adjustable magnetic tuning core therefor.

4. A frequency discriminator comprising, a four arm bridge circuit, each of one pair of opposite arms of which includes an inductance coil, and each of the other pair of opposite arms of which includes a capacitor, a circuit for applying a frequency modulated potential to one pair of conjugate terminals, said circuit including a series connected impedance, an impedance of the same character as said series impedance connected between the other pair of conjugate terminals, rectifier means connected to said other pair of conjugate terminals, said inductance coils included in the one pair of opposite arms being closely coupled whereby said coils have a high mutual inductance.

5. A frequency discriminator comprising, a four arm bridge circuit, each of one pair of opposite arms of which includes an inductance coil, and each of the other pair of opposite arms of which includes a capacitor, said inductance coils included in the one pair of opposite arms being bifilarly wound, a common adjustable magnetic tuning core therefor, a circuit including a series connected impedance connected to one pair of conjugate terminals for applying a frequency modulated potential thereto, an impedance of the same character connected between the other pair of conjugate terminals, rectifying means for detecting the amplitude difference existing between said other pair of conjugate terminals connected thereto, and means for deriving an output signal from said rectifying means.

6. A frequency discriminator comprising, a four arm bridge circuit, each of one pair of opposite arms of which includes an inductance coil, and each of the other pair of opposite arms of which includes a capacitor, a circuit for applying a frequency modulated potential to one pair of conjugate terminals, said last mentioned circuit including a series connected resistor, a resistor interconnecting the other pair of conjugate terminals and rectifier means connected to said other pair of conjugate terminals.

7. A frequency discriminator comprising, a four arm bridge circuit, each of one pair of opposite arms of which includes an inductance coil, and each of the other pair of opposite arms of which includes a capacitor, said inductance coils included in the one pair of opposite arms being bifilarly wound, a common adjustable magnetic tuning core therefor, a circuit including a series connected resistance connected to one pair of conjugate terminals for applying a frequency modulated potential thereto, a resistor interconnecting the other pair of conjugate terminals, rectifier means connected to said other pair of conjugate terminals for detecting the amplitude difference existing therebetween, and means for deriving an output signal from said rectifying means.

GLADDEN B. HOUCK, Jr.

References Cited in the file of this patent

UNITED STATES PATENTS

| Number | Name | Date |
| --- | --- | --- |
| 2,286,378 | Roberts | June 16, 1942 |
| 2,369,055 | Lange | Feb. 6, 1945 |
| 2,581,968 | Norton | Jan. 8, 1952 |

FOREIGN PATENTS

| Number | Country | Date |
| --- | --- | --- |
| 632,374 | Great Britain | Nov. 28, 1949 |